(12) United States Patent
Nakamura et al.

(10) Patent No.: US 11,739,242 B2
(45) Date of Patent: Aug. 29, 2023

(54) ADHESIVE, LAMINATED FILM USING THEREOF AND POLYOL COMPOSITION FOR ADHESIVE

(71) Applicant: DIC Corporation, Tokyo (JP)

(72) Inventors: Makoto Nakamura, Tokyo (JP); Daiki Tomita, Tokyo (JP); Shigekazu Takahashi, Tokyo (JP); Bingbing Liu, Qingdao (CN); Feng Zhao, Qingdao (CN); Zhiqiang Liu, Qingdao (CN)

(73) Assignee: DIC Corporation, Tokyo (JP)

( * ) Notice: Subject to any disclaimer, the term of this patent is extended or adjusted under 35 U.S.C. 154(b) by 99 days.

(21) Appl. No.: 17/511,906

(22) Filed: Oct. 27, 2021

(65) Prior Publication Data

US 2022/0049140 A1    Feb. 17, 2022

Related U.S. Application Data

(63) Continuation of application No. 16/337,593, filed as application No. PCT/CN2017/104385 on Sep. 29, 2017, now Pat. No. 11,180,685.

(51) Int. Cl.
| | |
|---|---|
| *B32B 7/00* | (2019.01) |
| *B32B 27/00* | (2006.01) |
| *C08G 18/00* | (2006.01) |
| *C09J 175/06* | (2006.01) |
| *B32B 7/12* | (2006.01) |
| *B32B 27/40* | (2006.01) |
| *C08G 18/32* | (2006.01) |
| *C08G 18/48* | (2006.01) |
| *C08G 18/50* | (2006.01) |
| *C08G 18/76* | (2006.01) |
| *C09J 175/08* | (2006.01) |
| *C09J 175/04* | (2006.01) |

(52) U.S. Cl.
CPC ............ *C09J 175/06* (2013.01); *B32B 7/12* (2013.01); *B32B 27/40* (2013.01); *C08G 18/3275* (2013.01); *C08G 18/4825* (2013.01); *C08G 18/5021* (2013.01); *C08G 18/5024* (2013.01); *C08G 18/7671* (2013.01); *C09J 175/04* (2013.01); *C09J 175/08* (2013.01); *B32B 2553/00* (2013.01)

(58) Field of Classification Search
CPC .... B32B 7/00; B32B 7/10; B32B 7/12; B32B 27/00; B32B 27/40; C08G 18/00; C08G 18/30; C08G 18/32; C08G 18/327; C08G 18/3275; C08G 18/40; C08G 18/48; C08G 18/482; C08G 18/4825; C08G 18/50; C08G 18/502; C08G 18/5021; C08G 18/5024; C08G 18/70; C08G 18/76; C08G 18/767; C08G 18/7671
See application file for complete search history.

(56) References Cited

U.S. PATENT DOCUMENTS

| | | | |
|---|---|---|---|
| 3,647,513 A | 3/1972 | Jackson | |
| 3,886,122 A | 5/1975 | Fabris et al. | |
| 3,887,757 A | 6/1975 | Stone et al. | |
| 4,171,419 A | 10/1979 | Meyer et al. | |
| 4,756,785 A | 7/1988 | Konig et al. | |
| 4,923,756 A | 5/1990 | Chung et al. | |
| 5,134,216 A | 7/1992 | Jansen et al. | |
| 5,143,996 A | 9/1992 | Chung et al. | |
| 5,164,473 A | 11/1992 | Dormish et al. | |
| 5,204,439 A | 4/1993 | Dormish et al. | |
| 5,562,148 A | 10/1996 | Schneider | |
| 5,584,958 A | 12/1996 | Gillis et al. | |
| 5,672,229 A | 9/1997 | Konig et al. | |
| 5,981,683 A * | 11/1999 | Gillis ................. C08L 97/02 528/68 |
| 6,174,956 B1 | 1/2001 | Kerschner et al. | |
| 6,887,966 B2 | 5/2005 | Nomura et al. | |
| 7,931,970 B2 | 4/2011 | Schlingloff et al. | |
| 8,871,891 B2 | 10/2014 | Barker | |
| 9,738,820 B1* | 8/2017 | Vinci ................. C08G 18/4216 |
| 9,822,289 B2 | 11/2017 | Roock et al. | |
| 10,010,064 B2 | 7/2018 | Dugan et al. | |
| 2003/0092868 A1 | 5/2003 | Morikawa et al. | |
| 2003/0229194 A1 | 12/2003 | Nomura et al. | |
| 2004/0063892 A1 | 4/2004 | Morikawa et al. | |
| 2004/0138402 A1 | 7/2004 | Thiele et al. | |
| 2010/0297427 A1 | 11/2010 | Schlingloff et al. | |
| 2012/0295104 A1 | 11/2012 | Barker | |
| 2015/0096503 A1 | 4/2015 | Dugan et al. | |
| 2016/0090515 A1 | 3/2016 | Roock et al. | |
| 2016/0298009 A1 | 10/2016 | Dey et al. | |

(Continued)

FOREIGN PATENT DOCUMENTS

| | | |
|---|---|---|
| CA | 2136676 A1 | 5/1995 |
| CN | 1222551 A | 7/1999 |

(Continued)

OTHER PUBLICATIONS

International Search Report dated Jan. 4, 2018, issued for PCT/CN2017/104385.

(Continued)

*Primary Examiner* — Jacob T Minskey
*Assistant Examiner* — Matthew Hoover
(74) *Attorney, Agent, or Firm* — Locke Lord LLP

(57) ABSTRACT

Provided are a solvent-free two-component type adhesive capable of guaranteeing a practical packaging property, with an excellent curing property and significantly shortening aging time, a laminated film using the same, and a polyol composition for an adhesive. An adhesive, characterized in comprising a polyisocyanate composition (X) containing a polyisocyanate (A), and a polyol composition (Y) containing a polyol (C) and a tertiary amine compound (B) having multiple hydroxyl groups, as necessary components.

5 Claims, No Drawings

(56) References Cited

U.S. PATENT DOCUMENTS

| | | | |
|---|---|---|---|
| 2018/0044462 | A1 | 2/2018 | Blodau et al. |
| 2019/0016934 | A1 | 1/2019 | Yoshimoto et al. |
| 2019/0177575 | A1 | 6/2019 | Wu et al. |
| 2019/0202172 | A1 | 7/2019 | Schmidt et al. |
| 2019/0284456 | A1 | 9/2019 | Wu et al. |

FOREIGN PATENT DOCUMENTS

| | | | |
|---|---|---|---|
| CN | 104449540 B | | 4/2016 |
| EP | 304083 A2 | | 2/1989 |
| EP | 527568 A2 | | 2/1993 |
| EP | 1369443 A2 | | 12/2003 |
| EP | 3401379 A1 | | 11/2018 |
| JP | 11-181394 A | | 7/1999 |
| JP | 2001-288447 A | | 10/2001 |
| JP | 2003-171641 A | | 6/2003 |
| JP | 2003-171642 A | | 6/2003 |
| JP | 2003-171643 A | | 6/2003 |
| JP | 2005-161691 A | | 6/2005 |
| JP | 2006-096785 A | | 4/2006 |
| JP | 2006096785 | * | 4/2006 |
| JP | 2008-074903 A | | 4/2008 |
| KR | 20150020863 A | | 2/2015 |
| WO | 2011/107495 A1 | | 9/2011 |
| WO | 2012158664 A2 | | 11/2012 |
| WO | 2014036099 A1 | | 3/2014 |
| WO | 2015051299 A2 | | 4/2015 |
| WO | 2016/025234 A1 | | 2/2016 |
| WO | 2016164526 A1 | | 10/2016 |
| WO | 2016173926 A1 | | 11/2016 |
| WO | 2017196528 A1 | | 11/2017 |
| WO | 2017196529 A1 | | 11/2017 |
| WO | 2017196530 A1 | | 11/2017 |
| WO | 2017196531 A1 | | 11/2017 |
| WO | 2018140116 A1 | | 8/2018 |

OTHER PUBLICATIONS

International Search Report dated Jun. 28, 2017, issued for PCT/CN2016/100959.

* cited by examiner

ADHESIVE, LAMINATED FILM USING THEREOF AND POLYOL COMPOSITION FOR ADHESIVE

TECHNICAL FIELD

The present invention relates to a two-component type adhesive, a polyol composition for the adhesive using the same, and a laminated film formed by laminating various films with the adhesive. Specifically, the present invention relates to an adhesive for lamination, which can be used under the solvent-free condition and used when various kinds of plastic films, metallized films, aluminum foils and the like are laminated to produce composite films for primarily use in packing materials for food, pharmaceuticals and detergents and so on.

BACKGROUND ART

Polyurethane resin is widely used as a laminating adhesive for flexible packing materials in terms of its excellent adhesiveness to base materials and flexibility, and laminated films adhered with the urethane resin-based adhesives are used as packing materials for food, pharmaceuticals and detergents and so on.

A dry lamination process has become a predominated technology in the art, that is, a process of coating an adhesive dissolved in an organic solvent on a film and volatilizing the organic solvent when passing through an oven, thereby adhering to other films. However, from the viewpoint of reducing environmental load and improving operation environment, the demand for two-component type solvent-free laminating adhesives (hereinafter referred to as "two-component type adhesives"), which are free of an organic solvent, has gradually increased in recent years.

Two-component type solvent-free laminating adhesives are in need of an aging process so as to promote the curing reaction of adhesives after lamination. An aging temperature and aging time are varied with the adhesives used in the process, but the aging process is usually carried out for 1 to 5 days at 35 to 50° C., so it is required to shorten the aging time.

As a method of shortening the aging time, it is generally known to use an amine catalyst, but when an amine catalyst is used, adhesive coatings are prone to become hard and fragile, and thus the practical packaging property is poor.

As a method of obtaining both a practical packaging property and a shortened aging time of a solvent-free laminating adhesive, it has been known a two-component respectively-coating type urethane-based adhesives, which is obtained by combining a solvent-free part A comprising a compound having an isocyanate group on each molecular terminal as a main ingredient with a solvent-free part B comprising a compound having an amino on each molecular terminal as a main ingredient, wherein both part A and part B are liquid at normal temperature (e.g., see PLT 1). Furthermore, it is also known of an adhesive in which a compound having a tertiary amine in the molecule and a tackifying resin are further included in the aforementioned solvent-free part B (e.g., see PLT 2), and an adhesive using a compound having a hydroxyl group in the molecule as a main ingredient and further using a tertiary amine compound and/or organo-tin compound (e.g., see PLT 3).

However, each of the methods has a problem that the desired practical packaging property cannot be obtained.

PRIOR ART LITERATURE

Patent Literatures

PLT 1: JP-A-2003-171641
PLT 2: JP-A-2003-171642
PLT 3: JP-A-2003-171643

SUMMARY OF INVENTION

Problems to be Solved by the Invention

The present invention is intended to provide a solvent-free two-component type adhesive capable of guaranteeing a practical packaging property, with excellent curing property and significantly shortening aging time; provide a film for flexible packaging using the same, which has less bubble entrainment when laminated, an improved appearance of a laminated film, a hardened adhesive coating after curing and a better texture of flexible packaging.

Means for Solving the Problems

The inventors have accomplished the present invention based on the findings that a solvent-free two-component type adhesive comprising a polyisocyanate composition (X) containing a polyisocyanate (A), and a polyol composition (Y) containing a polyol (C) and a tertiary amine compound (B) having multiple hydroxyl groups, as necessary components is capable of guaranteeing a practical packaging property, with excellent curing property and significantly shortening aging time.

Specifically, the present invention provides an adhesive, which comprises a polyisocyanate composition (X) containing a polyisocyanate (A), and a polyol composition (Y) containing a polyol (C) and a tertiary amine compound (B) having multiple hydroxyl groups, as necessary components.

Further, the present invention provides a laminated film, wherein a cured adhesive is provided between the first base film and the second base film, the aforesaid adhesive is the adhesive as described above.

Additionally, the present invention provides a polyol composition for an adhesive containing a polyol (C) and a tertiary amine compound (B) having multiple hydroxyl groups.

In addition, the present invention provides a method for producing a film for flexible packaging, which is a method for producing a film for flexible packaging formed by coating the adhesive to a base material, comprising a step of separately coating two components, in which a polyisocyanate composition (X) containing a polyisocyanate (A) that is coated on one base material is brought into contact with a polyol composition (Y) containing a polyol (C) and a tertiary amine compound (B) having multiple hydroxyl groups that is coated on the other base material, and laminated.

Since the solvent-free two-component type adhesive of the present invention is capable of guaranteeing a practical packaging property, with excellent curing property and significantly shortening aging time, a laminated film with this adhesive has an excellent productivity and an excellent practical packaging property. In addition, the solvent-free two-component type adhesive of the present invention can be provided by combining the polyol composition for an adhesive of the present invention with a polyisocyanate composition (X) containing a conventional polyisocyanate (A).

Additionally, according to the production method of the present application, it is possible to obtain a film for flexible packaging, which has less bubble entrainment when laminated, an improved appearance of a laminated film, a hardened adhesive coating after curing and a better texture of flexible packaging.

EMBODIMENTS FOR CARRYING OUT THE INVENTION (Adhesive)

The adhesive of the present invention comprises a polyisocyanate composition (X) containing a polyisocyanate (A), and a polyol composition (Y) containing a polyol (C) and a tertiary amine compound (B) having multiple hydroxyl groups, as necessary components.

(Polyisocyanate (A))

The polyisocyanates (A) used in the present invention can be a generally known substances without particular limitations. As an example, it could be the following substances: polyisocyanate having an aromatic structure in the molecular structure, such as toluene diisocyanate, diphenylmethane diisocyanate, 1,5-naphthalene diisocyanate, triphenylmethane triisocyanate and xylylene diisocyanate, compounds obtained by modifying a moiety of the NCO group of these polyisocyanates with carbodiimides; allophanate compounds derived from these polyisocyanates; polyisocyanates having an alicyclic structure in the molecular structure, such as isophorone diisocyanate, 4,4'-methylenebis(cyclohexyl isocyanate) and 1,3-(isocyanatomethyl)cyclohexane; linear-chain aliphatic polyisocyanates such as 1,6-hexamethylene diisocyanate, lysine diisocyanate and trimethylhexamethylene diisocyanate, and allophanate compounds thereof; isocyanurate products of these polyisocyanates; allophanate products derived from these polyisocyanates; biuret products derived from these polyisocyanates; adduct products obtained by modifying with trimethylolpropane; polyisocyanates as reaction products of the aforementioned various polyisocyanates and polyol components, and the like.

Moreover, particularly in the present invention, reacting the aforesaid linear-chain aliphatic polyisocyanate and polyisocyanate having an aromatic structure in the molecular structure with a polyol component can impart a laminate with flexibility and improve its practical packaging property, so such a reaction product is preferred from this viewpoint. In this case, when the linear-chain aliphatic polyisocyanate reacts with the hydroxyl group of the polyol component, a urethane bond or an allophanate bond is formed and introduced into the polyisocyanate (A). When the aforesaid polyisocyanate having an aromatic structure and the aforesaid linear-chain aliphatic polyisocyanate are used in combination, preferred is the ratio from 99/1 to 70/30 by mass [polyisocyanate having an aromatic structure/linear-chain aliphatic polyisocyanate], from the viewpoint of low viscosity.

Here, a reaction ratio of the aforementioned polyisocyanate to the polyol component is preferably in such a range that the equivalence ratio of the isocyanate group to the hydroxyl group of the polyol component [isocyanate group/hydroxyl group] is from 1.5 to 5.0, from the viewpoint of balance between cohesion and flexibility of the adhesive coating.

In addition, as a polyol component reacting with the above polyisocyanate having an alicyclic or aromatic structure in the molecular structure, specifically, it includes, chain aliphatic diols such as ethanediol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutadiol, butyl ethyl propanediol, diethylene glycol, triethylene glycol, tetraethylene glycol, dipropylene glycol, tripropylene glycol and bis(hydroxyethoxy)benzene; alicyclic diols such as 1,4-cyclohexanediol and 1,4-cyclohexanedimethanol; trifunctional or tetra-functional aliphatic alcohols such as glycerin, trimethylolpropane and pentaerythritol; bisphenols such as bisphenol A, bisphenol F, hydrobisphenol A and hydrobisphenol F; dimerdiol; polyether polyol obtained by subjecting the aforesaid diols, trifunctional or tetra-functional aliphatic alcohols, etc., and alkylene epoxides such as ethylene oxide, epoxypropane, epoxybutane, styrene oxide, epoxy chloropropane, tetrahydrofuran and cyclohexylidene oxide to addition polymerization in the presence of a polymerization initiator; polyester polyol (1) as a reaction product of the aforesaid diol or trifunctional or tetra-functional aliphatic alcohol and a polyester obtainable by ring-opening polymerization of cyclic ester compounds such as propiolactone, butyrolactone, ε-caprolactone, σ-valerolactone and β-methyl-σ-valerolactone; polyester polyol (2) obtained by reacting polycarboxylic acids with polyols such as the aforementioned chain aliphatic diol, alicyclic diol, dimerdiol, bisphenol or the aforementioned polyether polyol; polyester polyol (3) obtained by reacting the aforementioned trifunctional or tetra-functional aliphatic alcohol with a polycarboxylic acid; polyester polyol (4) obtained by reacting the bifunctional polyol, trifunctional or tetra-functional aliphatic alcohol with a polycarboxylic acid; polyester polyol (5) as a polymer of hydroxy acids such as dimethylol propionic acids and castor oil fatty acids; a mixture of the foregoing polyester polyol (1), (2), (3), (4), (5) and a polyether polyol, etc.; a castor oil-based polyol such as castor oil, dehydrated castor oil, a hydride of castor oil (i.e., hydrogenated castor oil), and an alkylene oxide adduct in a mole ratio of 5-50 to castor oil, etc.

Here, as an example, the polycarboxylic acid used in the process of producing the foregoing polyester polyol (2), (3) or (4) include noncyclic aliphatic dicarboxylic acids such as succinic acid, adipic acid, azelaic acid, sebacic acid, dodecanedioic acid, maleic anhydride and fumaric acid; alicyclic dicarboxylic acids such as 1,3-cyclopentanedicarboxylic acid and 1,4-cyclohexanedicarboxylic acid; aromatic dicarboxylic acids such as terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyl dicarboxylic acid and 1,2-bis(phenoxyl)ethane-p'p-dicarboxylic acid; anhydrides or ester-forming derivatives of these aliphatic or aromatic dicarboxylic acids; p-hydroxybenzoic acid, p-(2-hydroxyethoxy) benzoic acid and ester-forming derivatives of these dihydroxycarboxylic acids, and polyacids such as dimer acids.

Among these polyol components, particularly a polyisocyanate obtained by reacting the aforesaid polyisocyanate with the aforesaid polyether polyol as a necessary component is preferred in terms of the wettability.

From the viewpoint of shortening aging time and guaranteeing a suitable practical packaging property, the weight average molecular weight (Mw) of the above polyisocyanate (A) is preferably in a range of from 3000 to 10000. As far as suitable resin viscosity and good coating property are concerned, it is preferable that an amount of isocyanates is 5-20% by mass as measured by titration (with di-n-butylamine).

(Tertiary Amine Compound (B) Having Multiple Hydroxyl Groups)

The polyol composition (Y) in the present invention comprises a polyol (C) and a tertiary amine compound (B) having multiple hydroxyl groups.

The aforementioned tertiary amine compound (B) having multiple hydroxyl groups must have two or more, preferably 2 to 6 hydroxyl groups, and has one or more, preferably 1 to 2 tertiary amino group(s).

Specifically, examples of the tertiary amine compound (B) having multiple hydroxyl groups include polypropylene glycol ethylene diamine ether, tri(1,2-polypropylene glycol) amine, N-ethyldiethanolamine, N-methyl-N-hydroxyethyl-N-hydroxyethoxyethylamine, pentakis-hydroxypropyl diethylenetriamine, tetrahydroxypropyl ethylenediamine, and the like.

The tertiary amine compound (B) having multiple hydroxyl groups may be a commercially available product. As a commercially available product, it can include ED-500, TE-360 and so on, which is manufactured by KUKDO Chemical Co., Ltd.

It is undetermined in the present invention that why curing becomes faster by using a polyol composition (Y) containing the aforesaid polyol (C) and tertiary amine compound (B) having multiple hydroxyl groups, but the present invention provides the following inference:

A tertiary amine compound having multiple hydroxyl groups can usually become a self-catalytic polyol. It is inferred that it is a structure in which tertiary amine is adjacent to hydroxyl groups, so the catalysis significantly acts, and thus curing is faster thereby.

In the present invention, the hydroxyl groups of the tertiary amine compound (B) having multiple hydroxyl groups are preferably secondary hydroxyl groups or tertiary hydroxyl groups. By being secondary hydroxyl groups or tertiary hydroxyl groups, it can maintain the usable time (i.e. pot life) after the mixing of two components; in addition, it will not prevent the mixing of the laminated (X) and (Y) even in the step of separately coating two components.

(Polyol Composition (Y) Containing a Polyol (C))

Examples of the polyol (C) used in the present invention include, diols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutadiol, butyl ethyl propanediol, diethylene glycol, triethylene glycol, tetraethylene glycol, dipropylene glycol, tripropylene glycol, bis(hydroxyethoxy) benzene, 1,4-cyclohexanediol, 1,4-cyclohexanedimethanol, and triethylene glycol; trifunctional or tetra-functional aliphatic alcohols such as glycerin, trimethylolpropane and pentaerythritol; bisphenols such as bisphenol A, bisphenol F, hydrobisphenol A and hydrobisphenol F;

dimerdiol; polyether polyol obtained by subjecting the aforesaid diols, trifunctional or tetra-functional aliphatic alcohols, etc., and alkylene epoxides such as ethylene oxide, epoxypropane, epoxybutane, styrene oxide, epoxy chloropropane, tetrahydrofuran and cyclohexylidene oxide to addition polymerization in the presence of a polymerization initiator; polyether urethane polyol obtainable by further increasing the molecular weight of the above polyether polyol with the aforementioned aromatic or aliphatic polyisocyanate; polyester polyol (1) as a reaction product of a polyester obtainable by ring-opening polymerization of cyclic ester compounds such as propiolactone, butyrolactone, ε-caprolactone, σ-valerolactone and β-methyl-σ-valerolactone and polyols such as the aforesaid diol, glycerin, trimethylolpropane and pentaerythritol;

polyester polyol (2) obtained by reacting polycarboxylic acids with bifunctional polyols such as the aforementioned diol, dimerdiol or the aforementioned bisphenol;

polyester polyol (3) obtained by reacting the aforementioned trifunctional or tetra-functional aliphatic alcohol with a polycarboxylic acid; polyester polyol (4) obtained by reacting the bifunctional polyol, trifunctional or tetra-functional aliphatic alcohol with a polycarboxylic acid; polyester polyol (5) as a polymer of hydroxy acids such as dimethylol propionic acid and castor oil fatty acid; polyester-polyether polyol obtainable by reacting the preceding polyester polyols (1)-(5) with the preceding polyether polyol and aromatic or aliphatic polyisocyanate; polyester urethane polyols obtained by increasing the molecular weight of the preceding polyester polyols (1)-(5) with the aromatic or aliphatic polyisocyanate; a mixture of the polyester polyols (1)-(5) and a polyether polyol, etc.; a castor oil-based polyol such as castor oil, dehydrated castor oil, a hydride of castor oil (i.e., hydrogenated castor oil), and an alkylene oxide adduct in a mole ratio of 5-50 to castor oil, etc. The weight average molecular weight (Mw) of the employed polyol (C) is preferably from 400 to 5000.

Examples of a polycarboxylic acid here include, aliphatic dicarboxylic acids such as succinic acid, adipic acid, azelaic acid, sebacic acid, dodecanedioic acid, maleic anhydride, fumaric acid, 1,3-cyclopentanedicarboxylic acid and 1,4-cyclohexanedicarboxylic acid; aromatic dicarboxylic acids such as terephthalic acid, isophthalic acid, 1,4-naphthalenedicarboxylic acid, 2,5-naphthalenedicarboxylic acid, 2,6-naphthalenedicarboxylic acid, naphthalic acid, biphenyl dicarboxylic acid and 1,2-bis(phenoxy)ethane-p'p-dicarboxylic acid; and anhydrides or ester-forming derivatives of these aliphatic or aromatic dicarboxylic acids; p-hydroxybenzoic acid, p-(2-hydroxyethoxy)benzoic acid and ester-forming derivatives of these dihydroxycarboxylic acids, and polyacids such as dimer acids.

(Amine Value)

In the adhesive of the present invention, an amine value contained in the aforesaid adhesive is preferably in a range of 0.5 to 40 mgKOH/g.

The amine value, as used herein, means the number of milligrams of KOH which is equivalent to the HCl required to neutralize 1 g of sample, which can be calculated, without limitation, by known methods. To be specific, for example, it is preferable to list the methods as shown below.

In the situations where a chemical structure of the amine compound is known and its average molecular weight and the like are further known as required, an amine value may be worked out by the following expression:

Amine value (mgKOH/g)=(number of amino in per molecule/average molecular weight)×56.1×1000

In addition, when a chemical structure, an average molecular weight and the like of the amine compound are unknown, the amine value may be measured by known measuring methods, for instance, examples of a method for measuring an amine value may include a method for measuring an amine value in accordance with JIS-K7237-1995.

When an amine value is within such a range, the present invention can ensure a practical packaging property and achieve a more excellent curing property. The amine value is particularly preferably in a range of 1.5 to 35 mgKOH/g, more preferably in a range of 1.5 to 25 mgKOH/g.

(Mass Ratio)

Besides, in the adhesive of the present invention, a mass ratio of the polyol composition (Y) is preferably in a range of 10 to 150 when the polyisocyanate composition (X) is set as 100. By setting such a range, the present invention can ensure a practical packaging property and achieve a more excellent curing property. The mass ratio is particularly preferably in a range of 10 to 100.

(Solvent)

The adhesive of the present invention is an adhesive cured by a chemical reaction between an isocyanate group and a hydroxyl group, and it can be used in the form of a solvent-free adhesive. Note that the "solvent" of the solvent-free adhesive according to the present invention refers to an organic solvent with high capacity of dissolving the polyisocyanate (A) and the polyol (C) used in the present invention, and that the term "solvent-free" refers to be free of the organic solvent with the high dissolving capacity. The organic solvent refers to, specifically, toluene, xylene, dichloromethane, tetrahydrofuran, methanol, ethanol, isopropanol, methyl acetate, ethyl acetate, n-butyl acetate, acetone, methyl ethyl ketone (MEK), cyclohexnone, toluol, xylol, n-hexane, cyclohexane, or the like. Among them, toluene, xylene, dichloromethane, tetrahydrofuran, methyl acetate and ethyl acetate are known in the art.

On the other hand, when low viscosity or the like is required, the adhesive of the present invention can be used by diluting it suitably with the preceding organic solvent according to the desired viscosity. At this time, either or both of polyisocyanate composition (X) and polyol composition (Y) can be diluted. Examples of an organic solvent used in this situation include, methanol, ethanol, isopropanol, methyl acetate, ethyl acetate, n-butyl acetate, acetone, methyl ethyl ketone (MEK), cyclohexnone, toluene, xylene, n-hexane, cyclohexane, and the like. Among them, ethyl acetate and methyl ethyl ketone (MEK) are preferred, and ethyl acetate is particularly preferred in terms of the solubility. The amount of the organic solvent varies with the desired viscosity, but it is more often used within the range of roughly from 20 to 50% by mass.

In the adhesive of the present invention, the ratio of the aforesaid polyisocyanate composition (X) to the aforesaid polyol composition (Y) is preferably in such a range that the equivalence ratio [isocyanate group/hydroxyl group] of the isocyanate group of the aforesaid polyisocyanate (A) to the hydroxyl group of the aforesaid polyol (C) is from 0.6 to 5.0 in terms of excellent adhesive strength and heat resistance during heat-seal, particularly preferably from 1.0 to 3.5 from the viewpoint that these properties become significant.

In addition to the polyisocyanate composition (X) and the aforesaid polyol (C), as adhesives of the present invention, alicyclic amide compounds other than the aforesaid tertiary amide compound (B) having multiple hydroxyl groups can be further mixed into either component of the polyisocyanate composition (X) or the polyol composition (Y), or mixed as a third component at the time of coating, so as to effectively inhibit harmful low molecular weight chemical substances represented by aromatic amines from dissolving out to the contents in the laminated packaging products.

Examples of the alicyclic amide compounds used herein include δ-lactam, ε-hexanolactam, ω-heptalactam, η-caprylolactam, β-propionlactam, and the like. Among them, ε-hexanolactam is preferred in terms of the excellence in the effect of reduction in stripping amount of low molecular weight chemical substances. Besides, regarding the mixing amount of the alicyclic amide compound, it is mixed in an amount of preferably from 0.1 to 5 parts by mass relative to per 100 parts by mass of the polyol (C).

The adhesive of the present invention can be used in combination with pigments as required. Examples of possibly available pigments here include, but not particularly limited to, those listed in *Handbook of Paint Raw Materials* of 1970 edition (compiled by Japan Paint Manufacturers Association), including organic and/or inorganic pigments such as extender pigments, white pigments, black pigments, gray pigments, red pigments, brown pigments, green pigments, blue pigments, metal powder pigments, luminous pigments and pearl pigments, further plastic pigments, and the like. As specific examples of these colorants, various kinds of substances are described. As organic pigments, they include, for instance, various insoluble azo pigments such as Benzidine Yellow, Hansa Yellow and Lake Red 4R; soluble azo pigments such as Lake Red C, Carmine 6B and Bordeaux 10; various (copper) phthalocyanine pigments such as Phthalocyanine Blue and Phthalocyanine Green; various basic dyeing lakes such as Rhodamine Lake and Methyl Violet Lake; various mordant dyeing pigments such as Quinoline Lake and Fast Sky Blue; various vat dyeing pigments such as Anthraquinone pigments, Thioindigo pigments and Perionone pigments; various quinacridone pigments such as Cinquasia Red B; various dioxazine pigments such as Dioxazine Violet; various condensed azo pigments such as Cromophtal; Aniline Black; and the like.

Examples of inorganic pigments include, various chromates such as chrome yellow, zinc chromate and Molybdate Orange; various ferrocyanides such as iron blue; various metallic oxides such as titanium oxide, zinc white, Mapico Yellow, iron oxide, red iron oxide, chromium oxide green and zirconia; various sulfides such as cadmium yellow, cadmium red and mercuric sulfide, and/or selenides; various sulfates such as barium sulfate and lead sulfate; various silicates such as calcium silicate and ultramarine; various carbonates such as calcium carbonate and magnesium carbonate; various phosphates such as cobalt violet and manganese violet; various metal powder pigments such as aluminium powder, gold powder, silver powder, copper powder, bronze powder and brass powder; flake pigments and mica flake pigments of these metals; metal pigments and/or pearl pigments such as mica flake pigments with metal-oxide-covered morphology and micaceous iron oxide pigment; graphite, carbon black and so on.

Examples of extender pigments include, Precipitated Barium Sulfates, Paris white (gofun), Precipitated Calcium Carbonates, Ground Calcium Carbonates, white marble, alumina white, silica, hydrated fine silica (white carbon), superfine anhydrous silica powder (fumed silica), quartz sand (silica sand), talc, Precipitated Magnesium carbonates, bentonites, clay, kaolin, loess, and so on.

Furthermore, as plastic pigments, they include, for instance, "GRANDOLL PP-1000", "PP-2000S", etc., manufactured by DIC CORPORATION.

The pigments used in the present invention are more preferably inorganic oxides such as titanium oxide as a white pigment and zinc white, and carbon black as a black pigment in terms of the excellent durability, weather resistance and designability.

Regarding the mass ratio of pigments used in the present invention, it is more preferably set as 1 to 400 parts by mass, especially 10 to 300 parts based on 100 parts by mass of the total sum of the polyisocyanate composition (X) and the polyol (C) in terms of the excellent adhesion, blocking resistance, etc.

In addition, an adhesion promoter can be used optionally in the adhesive of the present invention. The adhesion promoter can include coupling agents such as silane coupling agents, titanate coupling agents and aluminium-based coupling agents, epoxy resins.

Examples of silane coupling agents include, amino silanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyldimethoxy silane and N-phenyl-γ-aminopropyltrimethoxysilane; epoxy silanes such as β-(3,4-epoxycyclohexyl)ethyltrimethoxysilane, γ-epoxypropoxypropyltrimethoxysiliane and γ-epoxypropoxy propyltriethoxysiliane; vinyl silanes such as vinyltris(β-methoxyethoxy)silane, vinyltriethoxysilane, vinyltrimethoxysilane and γ-methacryloxypropyltrimethoxyl silane; hexamethyldisilazane, γ-mercaptopropyltrimethoxysilane, and the like.

Examples of titanate coupling agents include, titanium tetraisopropoxide, titanium tetra-n-butoxide, butyl titanate dimer, tetrastearl titanate, titanium acetylacetonate, titanium lactate, tetraoctyleneglycol titanate, titanium lactate, tetrastearoxy titanium, and the like.

Besides, as aluminium-based coupling agents, they include, for instance, acetoalkoxyaluminum diisopropylate, and the like.

Examples of epoxy resins include various epoxy resins such as usually commercially available epoxy-bisphenol, novolac, β-methylepichlorohydrin, cyclic oxirane, glycidyl ether, glycidyl ester, polyglycol ether, glycol ether, epoxy aliphatic ester, polycarboxylic ester, aminoglycidyl, and resorcinol epoxy resins.

The adhesive of the present invention may optionally comprise other additives than the foregoing ones as required. Examples of additives include leveling agents; inorganic particles such as colloidal silica and alumina sol; polymethyl methacrylate-based organic particles; defoamers; anti-sagging agents; wetting dispersants; viscosity modifiers; ultraviolet absorbers; metal deactivators; peroxide decomposers; flame retardants; reinforcing agents; plasticizers; lubricants; antirust agents; fluorescent brighteners; inorganic heat ray absorbers; fire retardants; antistatic agents; dehydrating agents; and the like.

These pigments, adhesion promoters or additives can be mixed into either component of the polyisocyanate composition (X) or the polyol composition (Y), or can be mixed as a third component at the time of coating.

(Production Method)

The laminated film of the present invention can be obtained by a known method, for example, a method for obtaining a laminated film by coating a polyisocyanate composition (X) containing a polyisocyanate (A) and a polyol composition (Y) containing a polyol (C) and a tertiary amine compound (B) having multiple hydroxyl groups, which have been mixed in advance, as the adhesive of the present invention, on a first plastic film, laminating a second plastic film on the coated side, and then curing the adhesive layer (production method 1); a method for obtaining a laminated film by coating said polyisocyanate composition (X) and said polyol composition (Y) separately on a first plastic film and a second plastic film, and then bringing the coated sides into contact with each other and laminating them (namely, a step of separately coating two components) so that the first plastic film and the second plastic film are laminated, and curing the adhesive layer (production method 2).

In the present invention, when the production method 2 is carried out by a step of separately coating the following two components (also referred to as separate coating), the excellent curability as an effect of the adhesive of the present invention can be maximized, and it is preferable; the step of separately coating two components is a step of bringing a polyisocyanate composition (X) containing a polyisocyanate (A), which is coated on one base material, into contact with a polyol composition (Y) containing a polyol (C) and a tertiary amine compound (B) having multiple hydroxyl groups, which is coated on the other base material, and then laminating them.

(Production Method 1)

Examples of the aforesaid production method 1 include: coating the adhesive of the present invention formed by pre-mixing the aforementioned polyisocyanate composition (X) with the aforementioned polyol composition (Y) on a first plastic film with a roll coater, followed by adhering it to the other base material without subjecting a drying step.

Any coating conditions are available as long as they are compatible with the coating equipment. However, in terms of a conventional roll coater, it is preferable that the coating is carried out in the conditions of heating to about 25° C. to about 120° C. and setting a viscosity of the adhesive of the present invention as 2500 mPa·s or less. The viscosity range is more preferably 2000 mPa·s or less. In addition, it would be better that the coating amount is preferably 0.5 to 5.0 g/m$^2$, more preferably about 1.0 to about 4.0 g/m$^2$.

(Production Method 2)

As an example of the aforesaid production method 2, i.e., so-called separate coating, in the adhesive of the present invention, said polyisocyanate composition (X) and said polyol composition (Y) are respectively coated on a first plastic film and a second plastic film. For example, if said polyisocyanate composition (X) is coated on a first plastic film, said polyol composition (Y) will be coated on a second plastic film, and vice versa. Next, two base materials are adhered to allow component A and component B to be contacted and laminated to initiate the reaction so that curing proceeds rapidly, and the mixing of two components is not required as in the conventional two-component mixed adhesive, so it is not necessary to worry about the usable time (pot life) after the mixing of the two components, thereby boasting excellent operability. The laminating method is preferably a dry laminating method (dry-type lamination). Preferably, a laminating roller has a temperature of from a room temperature to about 120° C. and a pressure of from about 3 to 300 kg/cm$^2$. In such a way can a flexible packaging film be obtained.

In the case of separate coating, it is desired that the coating is performed at a lower viscosity so as to more efficiently proceed the mixing of the adhered polyisocyanate composition (X) and polyol composition (Y). Specifically, the coating is performed preferably at a viscosity of 1000 mPa·s or less. In addition, the coating amounts of the polyisocyanate composition (X) and the polyol composition (Y) are preferably 0.5 to 3.0 g/m$^2$, more preferably 0.5 to 2.0 g/m$^2$, respectively.

No matter either of the methods is adopted, the adhesive is cured for 6-24 hours at normal temperature or at elevated temperature after lamination, and exhibits practical physical properties as long as the adhesive of the present invention is used.

As the first plastic film used herein, it includes base films such as PET (polyethylene terephthalate) films, nylon films, OPP (biaxially oriented polypropylene) films, various kinds of vapor deposited films, and aluminum foils, and the like. Besides, as the aforementioned other base materials, they include sealant films such as CPP (cast polypropylene) films and LLDPE (linear low density polyethylene) films.

The laminated films thereby obtained can be mainly used as packing materials for filling detergent and medicaments in industry. As a specific application, examples of the detergent and medicament include liquid detergents for washing, liquid detergents in kitchen, liquid detergents for bath, liquid soaps for bath, liquid shampoos, liquid hair conditioners, and the like.

Packing materials manufactured using the adhesives of the present invention have excellent adhesion and content endurance without any peeling from laminar structures such as delamination occuring, when filling contents such as detergents and medicaments, even filled for a long time.

EXAMPLES

Production Example 1

Synthesis of Polyisocyanate (A-1)

In a flask provided with an agitator, a thermometer and a nitrogen introducing pipe, 36 parts of 4'4-diphenylmethane diisocyanate and 19 parts of 2,4'-diphenylmethane diisocyanate were put into this reaction vessel, stirred at an atmosphere of nitrogen, and heated to 60° C. 11 Parts of polypropylene glycol (hereinafter abbreviated as "PPG") with a number average molecular weight of 400, 22 parts of PPG with a number average molecular weight of 1000, and 11 parts of PPG with a number average molecular weight of 2000 were dropwise added for several times, and stirred for 5-6 hours to terminate the carbamation reaction. The resulting polyisoocyanate contained an NCO group in an amount of 13.5% and had a melt viscosity at 40° C. of 1500 mPa·s. The polyisoocyanate hereinafter was abbreviated as "A-1".

Examples 1-21 and Comparative Examples 1-9

Adhesives were prepared according to the formulae in Tables 1, 2 and 3 and were evaluated as follows. The results were listed in Tables 1-3.

(Method for Producing Film for Flexible Packaging)

Films for flexible packaging were produced by production method (1) and production method (2).

(Production Method 1)

After the polyisocyanate composition (X) and the polyol composition (Y) were prepared into an adhesive according to the formulae disclosed in Tables 1-5, the adhesive was coated on a film A in such a coating amount that solid ingredients were about 2.0 g/m², and the coated side of the film A was adhered to a film B with a laminating machine, thereby preparing a laminated film for measuring shear strength.

(Production Method 2)

A polyisocyanate composition (X) and a polyol composition (Y) were respectively prepared according to the formulae disclosed in Tables 1-5, and (X) was coated on a film A and (Y) was coated on a film B, followed by preparing a plastic film laminate by laminating the coated sides of the films A and B by using a nip roll (nip roll temperature: 50° C.). The coating amount of each of (X) and (Y) conformed to the mass ratios between (X) and (Y) in Tables 1-3, i.e., 2.0 g/m² in total. The processing speed was 30 m/min.

(Methods of Evaluation)

(Shear Strength)

As film A and film B, polyethylene terephthalate films (hereinafter abbreviated as "PET film") were used. Laminated films for measuring shear strength were prepared as per production method (1) and production method (2).

The laminated film was cut into 10 mm-width strips, and then the strips were cut to open a split of 1 cm alternatively on the front and back surface along the width direction to prepare test pieces. The test pieces were then stretched using a tensile testing machine with a tensile speed of 5 mm/min at an atmosphere temperature of 25° C. at each separated period to measure the shear strength of adhesion parts. The unit of the shear strength was set as N/10 mm.

To compare how much the aging time is shortened, laminated films were prepared to evaluate shear strength two hours later.

6: 40N or greater
5: 30-39N
4: 20-29N
3: 10-19N
2: 1-9N
1: 0.9N or less (Practical Packaging Property)

As a film A, a biaxially oriented polypropylene film (hereinafter abbreviated as "OPP film") was used, and as a film B, an aluminum deposited unstretched polypropylene film (hereinafter abbreviated as "VMCPP") was used. Laminated films for measuring a practical packaging property were prepared as per production method (1) and production method (2).

This laminated film was aged for 3 days at 40° C., so that the adhesive coating was cured, and then a practical packaging property was evaluated.

The test was conducted with a Gelbo Flex tester (a Gelbo Flex tester equipped with a BE-1006 thermostat, supplied by TESTER SANGYO CO., LTD.) in accordance with ASTMF392 under the conditions of a torsion angle of 440° and 1000 times of bends.

The evaluation was based on numbers of pinholes and delaminations within a scale of 10 cm².

6: occurrence number 0
5: occurrence number 1 or 2
4: occurrence number 3-5
3: occurrence number 6-8
2: occurrence number 9-11
1: occurrence number 12 or greater

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Formula | | | | | | | | | | |
| Polyisocyanate composition (X) | | | | | | | | | | |
| Polyisocyanate (A) | (A-1) | 55.0 | 55.0 | 61.0 | 61.0 | 65.0 | 65.0 | 76.0 | 90.0 | 70.0 |
| Polyol composition (Y) | | | | | | | | | | |
| Polyol (C) | PPG-2000 | 31.0 | 38.0 | 25.0 | 32.0 | 21.0 | 28.0 | 16.0 | | |
| | Castor oil | | | | | | | | 2.0 | 23.0 |
| | HA-380B | | | | | | | | | |
| | HA-700B | | | | | | | | | |

TABLE 1-continued

| | | Example 1 | Example 2 | Example 3 | Example 4 | Example 5 | Example 6 | Example 7 | Example 8 | Example 9 |
|---|---|---|---|---|---|---|---|---|---|---|
| Tertiary amine compound (B) having multiple hydroxyl groups | ED-500 | 14.0 | 7.0 | 14.0 | 7.0 | 14.0 | 7.0 | 8.0 | 8.0 | 7.0 |
| | TE-360 | | | | | | | | | |
| Tertiary amine compound | TEA | | | | | | | | | |
| | DEA | | | | | | | | | |
| Total | | 100.0 | 100.0 | 100.0 | 100.0 | 100.0 | 100.0 | 100.0 | 100.0 | 100.0 |
| Melt viscosity at 40° C. of (X) (mPa·s) | | 1500 | 1500 | 1500 | 1500 | 1500 | 1500 | 1500 | 1500 | 1500 |
| Melt viscosity at 40° C. of (Y) (mPa·s) | | 137 | 144 | 135 | 143 | 134 | 142 | 136 | 137 | 217 |
| Amine value in (X) + (Y) (mgKOH/g) | | 17.5 | 8.7 | 17.5 | 8.7 | 17.5 | 8.7 | 10.0 | 10.0 | 8.7 |
| Mass ratio of (Y) when (X) is set as 100 | | 82 | 82 | 64 | 64 | 54 | 54 | 32 | 11 | 43 |
| Evaluation results | | | | | | | | | | |
| Production Method (1) | Shear strength | 6 | 5 | 6 | 5 | 6 | 5 | 6 | 6 | 5 |
| | Practical packaging property | 6 | 5 | 6 | 5 | 6 | 5 | 5 | 5 | 5 |
| Production Method (2) | Shear strength | 4 | 4 | 5 | 5 | 5 | 5 | 6 | 6 | 5 |
| | Practical packaging property | 5 | 5 | 5 | 5 | 5 | 5 | 6 | 6 | 5 |

TABLE 2

| | | Example 10 | Example 11 | Example 12 | Example 13 | Example 14 |
|---|---|---|---|---|---|---|
| Formula | | | | | | |
| Polyisocyanate composition (X) | | | | | | |
| Polyisocyanate (A) | (A-1) | 55.0 | 55.0 | 65.0 | 65.0 | 70.0 |
| Polyol composition (Y) | | | | | | |
| Polyol (C) | PPG-2000 | 38.0 | 41.5 | 28.0 | 31.5 | |
| | Castor oil | | | | | 26.5 |
| | HA-380B | | | | | |
| | HA-700B | | | | | |
| Tertiary amine compound (B) having multiple hydroxyl groups | ED-500 | 7.0 | 3.5 | 7.0 | 3.5 | 3.5 |
| | TE-360 | | | | | |
| Tertiary amine compound | TEA | | | | | |
| | DEA | | | | | |
| Total | | 100.0 | 100.0 | 100.0 | 100.0 | 100.0 |
| Melt viscosity at 40° C. of (X) (mPa·s) | | 1500 | 1500 | 1500 | 1500 | 1500 |
| Melt viscosity at 40° C. of (Y) (mPa·s) | | 302 | 226 | 345 | 248 | 352 |
| Amine value in (X) + (Y) (mgKOH/g) | | 17.5 | 8.7 | 17.5 | 8.7 | 8.7 |
| Mass ratio of (Y) when (X) is set as 100 | | 82 | 82 | 54 | 54 | 43 |
| Evaluation results | | | | | | |
| Production Method (1) | Shear strength | 5 | 5 | 5 | 5 | 5 |
| | Practical packaging property | 5 | 5 | 5 | 5 | 5 |
| Production Method (2) | Shear strength | 4 | 4 | 5 | 5 | 5 |
| | Practical packaging property | 5 | 5 | 5 | 5 | 5 |

TABLE 3

| | | Example 15 | Example 16 | Example 17 | Example 18 | Example 19 | Example 20 | Example 21 |
|---|---|---|---|---|---|---|---|---|
| Formula | | | | | | | | |
| Polyisocyanate composition (X) | | | | | | | | |
| Polyisocyanate (A) | (A-1) | 70.0 | 70.0 | 70.0 | 70.0 | 70.0 | 65.0 | 65.0 |
| Polyol composition (Y) | | | | | | | | |
| Polyol (C) | PPG-2000 | | | 13.0 | 20.0 | 15.0 | | |
| | Castor oil | 29.5 | 28.0 | 10.0 | | | | |
| | HA-380B | | | | | | 31.5 | |
| | HA-700B | | | | | | | 31.5 |
| Tertiary amine compound (B) having multiple hydroxyl groups | ED-500 | 0.5 | 2.0 | 7.0 | 10.0 | 15.0 | 3.5 | 3.5 |
| | TE-360 | | | | | | | |
| Tertiary amine compound | TEA | | | | | | | |
| | DEA | | | | | | | |
| Total | | 100.0 | 100.0 | 100.0 | 100.0 | 100.0 | 100.0 | 100.0 |
| Melt viscosity at 40° C. of (X) (mPa·s) | | 1500 | 1500 | 1500 | 1500 | 1500 | 1500 | 1500 |
| Melt viscosity at 40° C. of (Y) (mPa·s) | | 265 | 308 | 411 | 475 | 638 | 1013 | 4500 |
| Amine value in (X) + (Y) (mgKOH/g) | | 1.2 | 5.0 | 17.5 | 24.9 | 37.4 | 8.7 | 8.7 |
| Mass ratio of (Y) when (X) is set as 100 | | 43 | 43 | 43 | 43 | 43 | 54 | 54 |
| Evaluation results | | | | | | | | |
| Production Method (1) | Shear strength | 4 | 5 | 5 | 5 | 5 | 5 | 5 |
| | Practical packaging property | 4 | 5 | 5 | 5 | 4 | 5 | 5 |
| Production Method (2) | Shear strength | 4 | 5 | 5 | 5 | 4 | 4 | 4 |
| | Practical packaging property | 4 | 5 | 5 | 5 | 4 | 5 | 4 |

TABLE 4

| | | Comparative Example 1 | Comparative Example 2 | Comparative Example 3 | Comparative Example 4 | Comparative Example 5 |
|---|---|---|---|---|---|---|
| Formula | | | | | | |
| Polyisocyanate composition (X) | | | | | | |
| Polyisocyanate (A) | (A-1) | 40.0 | 65.0 | 40.0 | 65.0 | 65.0 |
| Polyol composition (Y) | | | | | | |
| Polyol (C) | PPG-2000 | 60.0 | | 58.5 | | |
| | Castor oil | | 35.0 | | 33.5 | 32.0 |
| | HA-380B | | | | | |
| | HA-700B | | | | | |
| Tertiary amine compound (B) having multiple hydroxyl groups | ED-500 | | | | | |
| | TE-360 | 0.0 | 0.0 | | | |
| Tertiary amine compound | TEA | | | 1.5 | 1.5 | 3.0 |
| | DEA | | | | | |
| Total | | 100.0 | 100.0 | 100.0 | 100.0 | 100.0 |
| Melt viscosity at 40° C. of (X) (mPa·s) | | 1500 | 1500 | 1500 | 1500 | 1500 |
| Melt viscosity at 40° C. of (Y) (mPa·s) | | 150 | 250 | 147 | 241 | 231 |
| Amine value in (X) + (Y) (mgKOH/g) | | 0.0 | 0.0 | 8.3 | 8.3 | 16.7 |
| Mass ratio of (Y) when (X) is set as 100 | | 150 | 54 | 150 | 54 | 54 |
| Evaluation results | | | | | | |
| Production Method (1) | Shear strength | 1 | 1 | 1 | 1 | 2 |
| | Practical packaging property | 1 | 2 | 1 | 2 | 2 |
| Production Method (2) | Shear strength | 1 | 1 | 1 | 2 | 2 |
| | Practical packaging property | 1 | 2 | 1 | 2 | 2 |

TABLE 5

|  |  | Comparative Example 6 | Comparative Example 7 | Comparative Example 8 | Comparative Example 9 |
|---|---|---|---|---|---|
| Formula |  |  |  |  |  |
| Polyisocyanate composition (X) |  |  |  |  |  |
| Polyisocyanate (A) | (A-1) | 40.0 | 65.0 | 65.0 | 90.0 |
| Polyol composition (Y) |  |  |  |  |  |
| Polyol (C) | PPG-2000 | 59.6 |  |  |  |
|  | Castor oil |  | 33.9 | 32.8 |  |
|  | HA-380B |  |  |  |  |
|  | HA-700B |  |  |  |  |
| Tertiary amine compound (B) having multiple hydroxyl groups | ED-500 |  |  |  | 10.0 |
|  | TE-360 |  |  |  |  |
| Tertiary amine compound | TEA |  |  |  |  |
|  | DEA | 0.4 | 1.1 | 2.2 |  |
| Total |  | 100.0 | 100.0 | 100.0 | 100.0 |
| Melt viscosity at 40° C. of (X) (mPa·s) |  | 1500 | 1500 | 1500 | 1500 |
| Melt viscosity at 40° C. of (Y) (mPa·s) |  | 149 | 243 | 236 | 1125 |
| Amine value in (X) + (Y) (mgKOH/g) |  | 3.1 | 8.4 | 16.9 | 24.9 |
| Mass ratio of (Y) when (X) is set as 100 |  | 150 | 54 | 54 | 11 |
| Evaluation results |  |  |  |  |  |
| Production Method (1) | Shear strength | 1 | 1 | 2 | 5 |
|  | Practical packaging property | 1 | 2 | 2 | 2 |
| Production Method (2) | Shear strength | 1 | 1 | 2 | 5 |
|  | Practical packaging property | 1 | 2 | 2 | 2 |

Abbreviations in Tables 1-5 are listed as follows:

PPG-2000: polypropylene glycol (manufactured by Mitsui Chemicals Polyurethanes Co., Ltd., having a number average molecular weight of about 2000, a hydroxyl value of 55.2 mgKOH/g, a melt viscosity at 40° C. of 150 mPa·s)

Castor oil: refined castor oil (manufactured by ITOH Oil Chemicals Co., Ltd., having a hydroxyl value of 160.5 mgKOH/g, a melt viscosity at 40° C. of 250 mPa·s)

HA-380B: polyether urethane polyol (manufactured by DIC Co., Ltd., having a hydroxyl value of 91.0 mgKOH/g, a melt viscosity at 40° C. of 1,000 mPa·s)

HA-700B: polyester polyol (manufactured by DIC Co., Ltd., having a hydroxyl value of 130.0 mgKOH/g, a melt viscosity at 40° C. of 5000 mPa·s)

TEA: trimethylamine (manufactured by Daicel Corporation)

DEA: diethylamine (manufactured by Daicel Corporation)

ED-500: polypropylene glycol ethylenediamine ether

TE-360: tri (1,2-polypropylene glycol) amine

According to the above results, by comprising a tertiary amine compound (B) having multiple hydroxyl groups, Examples 1-21 began to exhibit shear strength earlier, and had a practical packaging property being good. That is, it could be said that Examples 1-21 could ensure a practical packaging property and exhibit excellent curing property, and could significantly shorten aging time. Comparative Examples 1-2, as a composition excluding an amine compound, exhibited apparently low shear strength and practical packaging property. Comparative Examples 3-5, as a composition to which a tertiary amine was added, exhibited obviously low shear strength and practical packaging property that are similar to Comparative Examples 1-2. Comparative Examples 6-8, as a composition to which the secondary amine was added, exhibited obviously low shear strength and practical packaging property that are similar to Comparative Examples 1 and 2. In Comparative Example 9, the polyol consisted only of a tertiary amine compound (B) having multiple hydroxyl groups so that it exhibited shear strength as earlier as the Examples did, but its practical packaging property was poor.

The invention claimed is:

1. An adhesive comprising:
   a polyisocyanate composition (X), containing:
      a polyisocyanate (A), and
   a polyester composition (Y), containing:
      a polyol (C) selected from the group consisting of a polyester polyol, a polyester urethane polyol, a polyether urethane polyol, a polyether polyol and a castor oil-based polyol, and
   a tertiary amine compound (B) having multiple hydroxyl groups,
   the adhesive having a viscosity of 2500 mPa·s or less when applied to a base material.

2. The adhesive according to claim 1, wherein an amine value of the adhesive ranges from 0.5 to 40 mgKOH/g.

3. The adhesive according to claim 1, wherein the polyol composition (Y) has a mass ratio of from 10 to 150 when the polyisocyanate composition (X) is set as 100.

4. The adhesive according to claim 1, further comprising an alicyclic amide compound.

5. The adhesive according to claim 4, wherein the mixing amount of the alicyclic amide compound is 0.1 to 5 parts by mass per 100 parts by mass of the polyol (C).

* * * * *